Nov. 5, 1929.　　　　H. S. PIERCE　　　　1,734,690
CONNECTING ROD
Filed Sept. 21, 1928　　　2 Sheets-Sheet 2

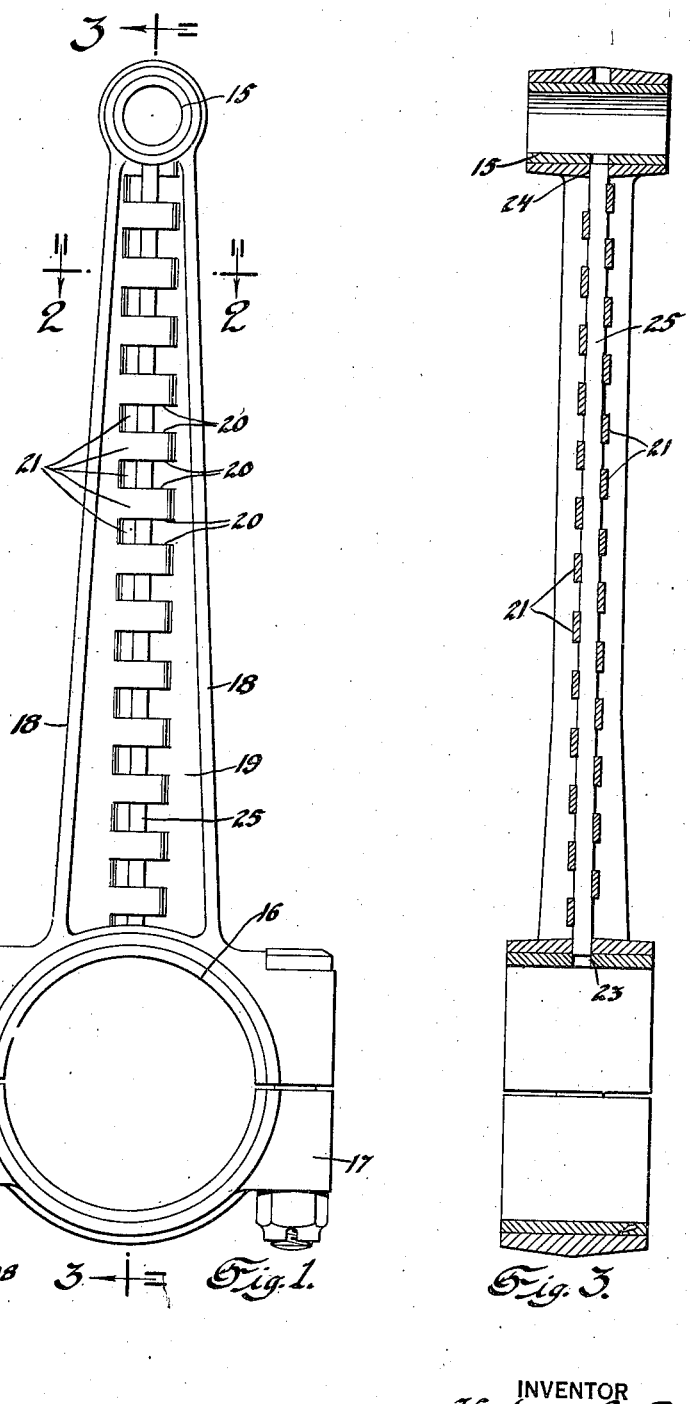

INVENTOR
Hodgson S. Pierce
BY Barnes, Dickey & Pierce
ATTORNEYS

Patented Nov. 5, 1929

1,734,690

UNITED STATES PATENT OFFICE

HODGSON S. PIERCE, OF DETROIT, MICHIGAN, ASSIGNOR TO EMIL A. NELSON, OF DETROIT, MICHIGAN

CONNECTING ROD

Application filed September 21, 1928. Serial No. 307,428.

This invention relates to connecting rods for internal combustion engines and the like and has for its principal object the provision of new and novel means for inserting and securing an oil duct between the crank pin and wrist pin ends thereof that will be economical to manufacture and reliable in use.

Another object is to provide means for securing an oil tube between the opposite ends of a connecting rod wherein the tube will be secured against movement over its entire length.

Another object is to provide means for securing an oil tube between the opposite ends of a connecting rod and to the web thereof without the necessity of drilling the web.

Another object is to provide a connecting rod in which alternate portions of the web thereof have been separated from each other and have been bent out of the plane of the web in opposite directions so as to form with one another an opening in the plane of the web extending from one end of the connecting rod to the other end thereof and in which an oil duct may be received.

A further object is to provide a method for securing an oil duct between the opposite bearing ends of the connecting rod comprising in separating and bending alternate portions of the web thereof outwardly of the plane of the web in opposite directions so as to effect an opening axially of the connecting rod within the web thereof, drilling the opposite ends of the connecting rod to connect with such opening, and thereafter inserting a tube in such opening between the opposite ends of the connecting rod and securing such tube therein.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views—

Fig. 1 is a side view of a connecting rod formed in accordance with the present invention.

Fig. 2 is a sectional view taken on the line 2—2 of Fig. 1.

Fig. 3 is a sectional view taken on the line 3—3 of Fig. 1.

Figure 5:
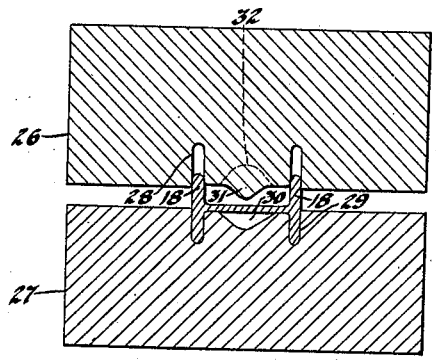
Fig. 5 is a sectional view taken on the line 5—5 of Fig. 4.

It is conventional practice in the higher class of internal combustion engines employing forced feed lubrication to connect the bearing surface of the crank pin end of the connecting rod with the bearing surface of the wrist pin end by an oil duct so that oil under pressure may be transmitted through the duct to the wrist pin bearing in order to insure proper and ample lubrication for such bearing. Heretofore, as far as I am aware, there have been but two methods of effecting the positive flow of oil to the wrist pin bearing. The first of these is by drilling a hole along the axis of the connecting rod between the two bearing surfaces and this is the method generally employed in connection with connecting rods of circular cross section. This method has also been employed in connection with connecting rods of the conventional H section by enlarging the web along its axis and drilling the oil hole through such enlargement. The second method which is generally employed in connection with connecting rods of the conventional H section type is to secure a tube between the opposite ends of the connecting rod by inserting its ends in suitably drilled holes at each end of the rod and securing the tube to the web intermediate the ends of the rod by clips or other like means.

The first of these methods, while resulting in a very satisfactory construction, is extremely costly to build due to the necessity of drilling the relatively long hole through the connecting rod with a drill of suitably small size. The second method is more or less unsatisfactory because of the possibility of the tube becoming displaced due to the terrific inertia forces acting upon the same at high engine speeds, and also to the relative high cost of clipping the tube to the web.

In the present invention I provide a construction that to all intents and purposes is as satisfactory as the drilling method and yet may be produced for a fraction of the cost. As illustrative of the present invention I show in the accompanying drawings a connecting rod having an opening 15 for the reception of the wrist pin and an opening 16 completed by the cap 17 for the crank pin. The body of the connecting rod is shown as of the conventional H type of section having flanges 18 and web 19 and may be of either forged or pressed steel construction. In accordance with the present invention the web 19 from one end of the connecting rod to the other is sheared perpendicularly to the axis of the rod and for a suitable distance along a plurality of spaced lines such as 20. This forms in the central portion of the web from one end to the other a plurality of short strap-like members 21 separated from each other at their sides and integrally connected at their ends to the remainder of the web 19. Thereafter, the central portion of each alternate portion 21 is bent out of the plane of the web 19 and all in the same direction, while the remainder of the members 21 are bent out of the plane of the web 19 in the opposite direction so that, as illustrated in Fig. 2, in looking along the axis of the connecting rod an opening such as 22 is formed in alignment with the axis of the connecting rod between the alternate members 21. An opening such as 23 may then be drilled in the crank pin end of the connecting rod to connect the bearing surface thereof with the opening 22 and an opening such as 24 may be drilled in the wrist pin end of the connecting rod to connect the bearing surface thereof with the opening 22, and through either the opening 23 or 24 a suitable tube such as 25 may be inserted, the tube 25 being of suitable length so as to connect the openings 23 and 24 and thus the openings 15 and 16. The tube 25 is, of course, sealed against leakage in the openings 23 and 24, as by fitting the same closely. Although the tube 25 may be secured against axial and rotatable movement relative to the web in any suitable manner I prefer, after the tube is inserted as described, to compress the members 21 in a plane perpendicular to the plane of the web 19 sufficiently to cause the members 21 to press into the tube 25 and cause a slight deformation of the same, as indicated in Fig. 3, thus effectively locking the tube 25 against axial or rotatable movement relative to the connecting rod.

It will be apparent that by this method of inserting and securing the tube in place the only drilling that is necessary is the relatively small amount necessary to connect the bearing surfaces at the end of the connecting rod with the web 19, there being ordinarily no necessity of running a drill through the opening formed by the alternately bent members 21, although this may be done when desired without consuming an appreciable length of time in view of the very slight amount of metal which would be removed during such drilling operation.

Figure 6:
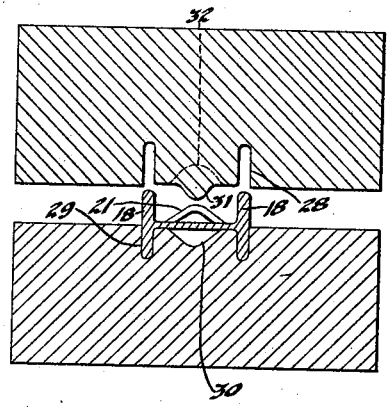
Fig. 6 is a view similar to Fig. 5 but showing the position of the connecting rod after the first shearing and bending operation has been performed thereon by the dies and is in position for the second operation.
Figure 4:
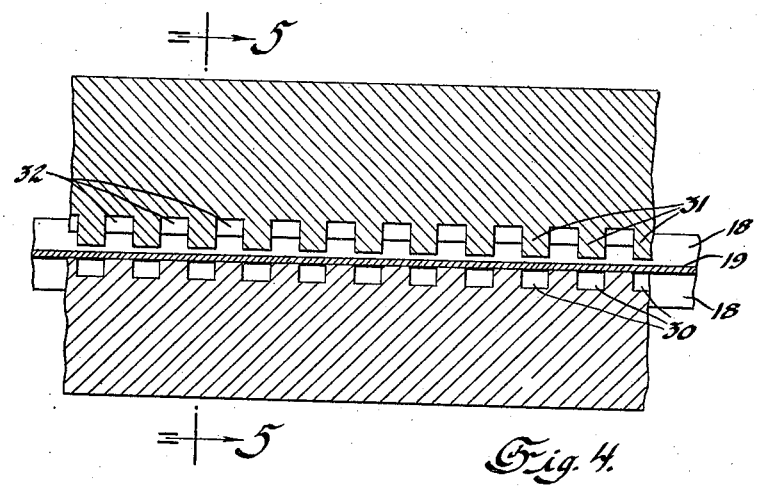
Fig. 4 is a fragmentary vertical sectional view taken axially through the center of the connecting rod shown positioned within the dies suitable for performing the shearing and bending operations upon the web thereof in accordance with the present invention.

The web may be sheared and the strips formed thereby bent simultaneously by suitable dies in a punch press or like machine. Although various forms of dies may be employed, one form is indicated in Figs. 4 to 6 inclusive. As indicated in Fig. 5, upper and lower die in halves 26 and 27 respectively are employed, the upper half being provided with suitable depressions such as 28 for receiving the upper half of the flanges of the connecting rod, and the lower half being provided with suitable depressions 29 for receiving the lower half of the flanges of the connecting rod. The faces of the halves 26 and 27 between the depressions 28 and 29 respectively, are each relieved an amount sufficient to accommodate the web of the connecting rod therebetween when the die halves are brought into contacting relationship. Between the depressions 29 in the lower half 27 is formed a series of depressions or pockets 30 spaced in accordance with the spacing of the various strap-like portions 21 to be formed in the connecting rod web, and the upper die half 26 is provided with a plurality of projections 31 adapted to extend into the pockets 30 when the die halves are brought together. The projections 31 are of substantially the same width as the pockets 30 so that when the die halves are brought together, they will shear the web along the edges of the pockets as at 20 in Fig. 1. The upper die half between the projections 31 is provided with pockets 32 so that after the operation illustrated in Fig. 5, has been performed the connecting rod may be turned over and again placed in the die half 27 in inverted position and moved axially an amount equal to the width of the portions 21 so that those portions 21 bent during the first operation will, during the second operation, be received in the pockets 32 without changing their shape, while the remaining portions 21 are bent out of the plane of the web in a direction opposite to the direction in which the first bent portions extend. The connecting rod is then ready for drilling and insertion of the tube, after which the portions 21 may be compressed so as to squeeze the tube between them and slightly deform it so as to lock it against axial movement.

The particular method of shearing and bending the portions 21 may obviously be varied from that indicated in the drawing, and formal changes may be made in the specific embodiment of the invention described without departing from the spirit or substance of the broad invention, the scope of which is commensurate with the appended claims.

What I claim is:

1. A connecting rod in which alternate transverse portions of the web thereof are bent outwardly of the normal plane of the web in one direction, and other portions of the web are bent outwardly of the normal plane of the web in a direction opposite to the first mentioned portions, whereby said portions combine to form a receiving and holding means for an oil tube adapted to extend along the length of said web between said alternate portions.

2. A connecting rod having the central portion of the web thereof separated transversely of its length along a plurality of spaced lines over the length of said web, those portions of said web between said lines being alternately bent out of the plane of the web in opposite directions, said rod being provided with an opening in each end thereof in alignment with the bent portions of said web, and a tube having its ends received in said openings and confined along said web between said alternately bent portions.

3. A connecting rod having end bearing surfaces, and a tube extending between said surfaces, said tube being held against movement intermediate said surfaces by alternately oppositely bent portions of the web of said connecting rod alternately embracing opposite sides thereof along the length of said web.

4. A connecting rod having alternate portions of the web thereof along the length of said web bent in opposite directions out of the plane of the web, and a tube extending along the length of said web in the plane thereof alternately embraced on opposite sides by said portions.

5. A connecting rod having alternate portions of the web thereof along the length of said web bent in opposite directions out of the plane of the web, and a tube extending along the length of said web in the plane thereof alternately embraced on opposite sides by said portions, the walls of said tube being depressed at the points of contact thereof with said portions whereby to lock said tube against movement.

6. In a connecting rod, in combination, a web, an oil tube extending along the length of said rod centrally of said web, and means for holding said tube against movement relative to said web comprising a plurality of strap members integral with said web and alternately embracing opposite sides of said tube.

HODGSON S. PIERCE.